Oct. 5, 1948.    G. G. HAVENS    2,450,728
LINKAGE FOR ARTIFICIAL LEGS
Filed July 26, 1947    2 Sheets-Sheet 1
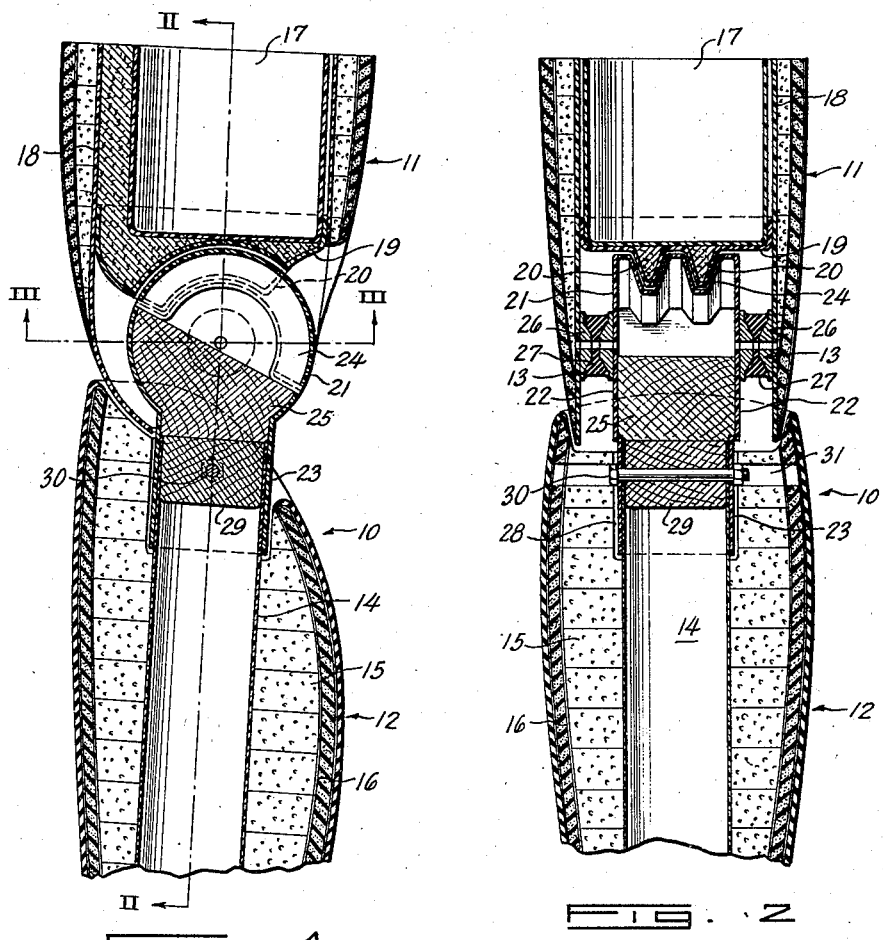
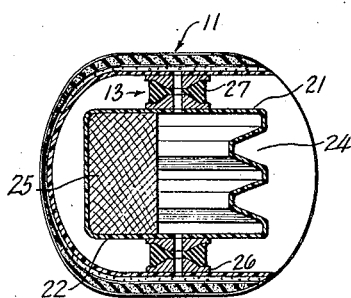
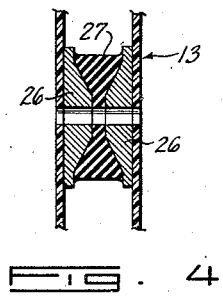
Inventor
Glenn G. Havens
By Thomas P. Mahoney
Attorney Oct. 5, 1948.     G. G. HAVENS     2,450,728
LINKAGE FOR ARTIFICIAL LEGS
Filed July 26, 1947     2 Sheets-Sheet 2
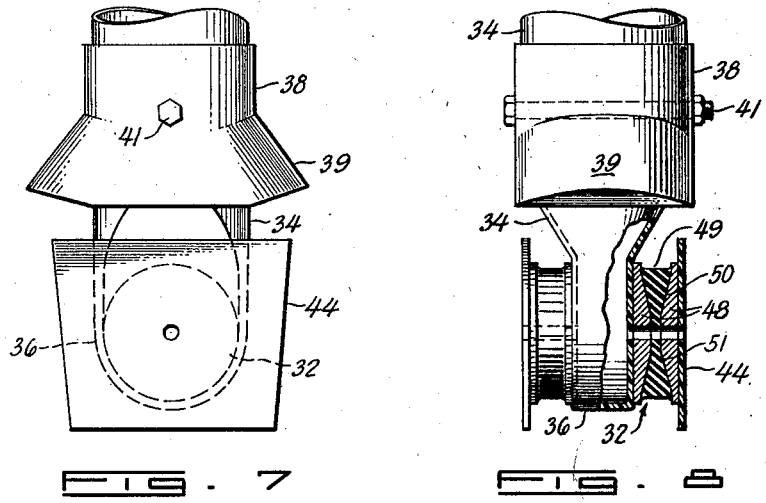
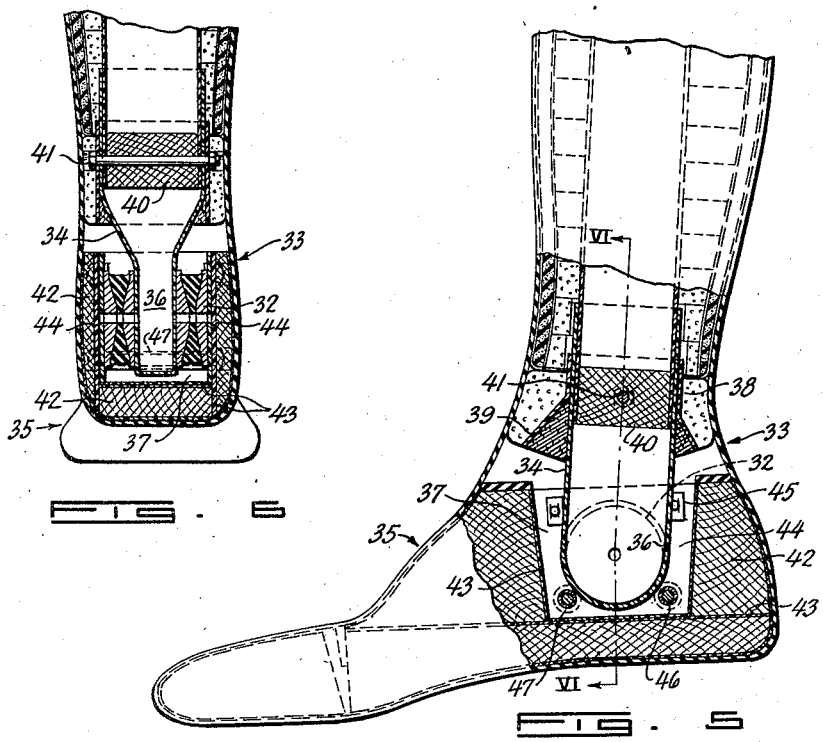
Inventor
Glenn G. Havens
By Thomas P. Mahoney
Attorney Patented Oct. 5, 1948

2,450,728

UNITED STATES PATENT OFFICE 2,450,728

LINKAGE FOR ARTIFICIAL LEGS

Glenn G. Havens, San Diego, Calif., assignor to Consolidated Vultee Aircraft Corporation, San Diego, Calif., a corporation of Delaware Application July 26, 1947, Serial No. 763,924

13 Claims. (Cl. 3—2)

This invention relates to improvements in prostheses and more particularly to improvements in linkages for prostheses.

The invention will be illustrated as utilized in conjunction with an artificial leg but it is, of course, conceivable that it could be incorporated in other types of prostheses. In the past, many attempts have been made to provide artificial legs which would simulate the appearance and action of a normal leg but they have not been too successful. In the first place, the actuation of prior art legs has depended, to a large extent, on complicated and cumbersome arrangements of straps and cables which are fitted to the body of the wearer of the leg and which he must control by movements of his body to cause the leg to function properly. Such bodily movements result in an unnatural appearance in the stride of the wearer and the leg does not impart the easy, normal movement which it is desired to achieve.

In addition, such legs frequently have embodied therein mechanical locking and clutch mechanisms which are adapted both to control the movements of the leg and prevent the leg from breaking at the knee joint when the weight of the wearer is imposed upon the leg. Typical mechanisms of this type are usually cumbersome and heavy and create a certain amount of noise when the leg is in motion. Naturally, noise of this type substantially derogates from the psychological security of the individual wearing the leg.

Of course, the greater the complexity of conventional prosthesis linkages the greater the amount of time and money that must be expended in the maintenance of them in proper functioning condition. It is desirable that expenditures for maintenance and repair be reduced to a minimum since individuals who must utilize such prostheses are frequently those who can least afford the cost of such upkeep. Naturally, if any major repairs must be made and the leg kept out of use for a considerable time, it will necessitate the inactivity of the owner of the leg.

Conventional prostheses are so designed and constructed that considerable shock loads are transmitted from the foot, through the leg and into the stump, causing discomfort and fatigue to the wearer. The transmission of such loads is facilitated by the fact that the connections between the various segments of the leg are purely mechanical and serve no shock absorbing function. In addition, since no provisions are made for the absorption of such loads there is a tendency for sharp impact loads to shatter the load bearing elements of the prosthesis.

Direct mechanical linkages embodied in conventional prostheses permit only straight line movement of the leg and recent analyses of normal leg movements have shown that, in addition to axial twisting of the thigh and shank structure, ankle movements embrace a considerable amount of plantarflexion and dorsiflexion or a combination of both. In the past, no attempt has been made to achieve the simulation of actual movements of this type in artificial limbs and thus it has been impossible for the wearer of conventional limbs to simulate a normal gait.

As indicated above, the maintenance and repair problems encountered in the use of conventional prosthesis linkages are apt to be a large factor in the expense of such devices since no provisions have been made for the ready replacement of worn or broken parts. The fact that no provisions have been made which would permit the mass production of such limbs has contributed materially to their high cost, since each limb has been practically a custom-made job.

Embodied in the prosthesis which will be described in the specification is a novel type of shank construction which is not the subject matter of the present invention but which is described in co-pending application, Serial No. 750,504, filed May 26, 1947. However, there are embodied in the present invention, which discloses linkage means for prostheses and locking means adapted to control said linkage means, means adapted to secure said shank to said linkages in such a manner that said shank may be readily removed from said linkages to permit the removal of said linkages for repair or replacement or to replace a new shank for use with said linkages.

It is, therefore, an object of the present invention to provide a linkage for the structural components of an artificial leg which will serve to actuate the leg without the use of conventional body straps or elaborate mechanisms embodied within the leg itself.

Another object of the present invention is the provision in an artificial leg of locking means adapted, when the weight of the wearer is imposed on the leg, to cause the leg to be locked and when the weight of the wearer is removed from the leg to cause it to be unlocked by permitting the longitudinal displacement of one of the components of the joint in which said locking means is incorporated in relation to the other.

A further object of the present invention is the provision of linkages for an artificial limb which are so designed and constructed that no noise is generated when the limb is in motion.

An additional object of the present invention is the provision of linkages for an artificial limb which are simple in construction, cheap to manufacture and which can be readily removed for replacement when worn out or damaged.

Another object of the present invention is the provision of linkages for an artificial leg which are capable of absorbing shock and impact loads and which prevent a large portion of such loads from being transmitted through the leg into the stump of the wearer.

A further object of the present invention is the provision of an artificial leg having embodied therein locking means adapted to limit the lateral displacement of the shin portion of the leg in relation to the thigh portion of the leg.

An additional object of the present invention is the provision in an artificial leg of linkages which permit the limited rotation of the shank of the leg about its vertical axis and which also permit the plantarflexion or dorsiflexion of the ankle or the combined dorsiflexion and plantarflexion of the ankle.

Other objects and advantages of the present invention will become apparent when the appended specification is read in conjunction with the accompanying drawings, in which:

Figure 1 is a vertical sectional view of an artificial leg having embodied therein a knee joint incorporating linkages exemplifying the present invention;

Figure 2 is a vertical sectional view taken on line II—II of Figure 1 and showing the knee joint linkages constructed in conformity with the present invention;

Figure 3 is a transverse sectional view taken on line III—III of Figure 1;

Figure 4 is a detailed sectional view of a linkage constructed in accordance with the present invention;

Figure 5 is a vertical sectional view of an ankle construction embodying linkages constructed in accordance with the present invention;

Figure 6 is a vertical sectional view taken on line VI—VI of Figure 5;

Figure 7 is a side elevational view showing the stop and mounting means associated with the ankle joint linkages; and Figure 8 is a front view, partly in elevation and partly in section, showing the manner of mounting the ankle linkages in the lower end of the shank assembly of an artificial leg.

There is shown in the drawings (Figure 1) a portion of an artificial leg 10 showing a thigh section 11 and a shank section 12 adapted to be connected to each other through the intermediary of linkage or connecting elements 13. The construction of thigh and shank sections 11 and 12 is not the subject of the present invention but since it is necessary that the linkage or connecting elements 13 be connected to both of these sections the basic structure will be briefly disclosed. As indicated above, the structure of the shank is fully disclosed in co-pending application, Serial No. 750,504 filed May 26, 1947.

The shank section 12 of the leg 10 is composed of a centrally disposed, weight bearing, tubular column 14 which has disposed thereabout a fairing comprised of a multiplicity of slabs or layers 15 of plastic foam superimposed one upon the other and adapted to impart a symmetrical configuration to the exterior shell of the shank. The symmetrical configuration of the leg is achieved by so forming the blocks that their peripheries cooperate to achieve the outline of a normal leg. The exterior shell of the shank includes a plastic skin 16 which is secured to the peripheries of the slabs 15 by an appropriate adhesive and then cured in position. The central, weight bearing column 14 and the skin 16 are both formed from a low-pressure plastic impregnated laminate which comprises an appropriate filler impregnated with a thermosetting resin. The skin 16 is covered by a combination of rubber and plastic elements adapted to impart life-like visual and tactual qualities to the leg. Thigh section 11 is of fundamentally similar construction to shank section 12 but no central bearing column is utilized. A stump socket 17 formed of a low-pressure plastic impregnated laminate is mounted within a shell 18 of similar material and surrounded by a bed of compressed fibrous material. Although allusion is made to the utilization of specific materials in the construction of the invention it is, of course, not intended that it be constructed only of these materials but only to indicate that they are preferred.

Secured to the lower end of the shell 18 is a plate 19 having formed therein a plurality of arcuate, V-shaped, depending elements 20 which are reinforced by a packing of fibrous material similar to that interposed between stump socket 17 and shell 18. Plate 19 is formed out of a low-pressure plastic impregnated laminate. Associated with plate 19 and adapted to act in cooperation therewith is a semi-cylindrical block or sheave 21 having flat sides 22 and a cylindrical depending neck or collar 23. The block 21 is formed of a low-pressure plastic impregnated laminate and has formed in the upper surface thereof a plurality of arcuate V-grooves 24 adapted to receive the V-shaped depending elements 20 in a cooperative relationship. Embraced within the interior of the block 21 is a reinforcing core 25 of maple or similar hardwood which serves to prevent the collapse of the cylindrical block 21 when crushing loads are imposed thereupon. Thigh section 11 and shank section 12 are joined together through the intermediary of resilient, deformable link or connecting elements 13 which comprise opposed frusto-conical mounting or bearing plates 26 having embraced therebetween annular discs 27 of rubber or similar resilient material having frusto-concave side walls adapted to receive the frusto-conical projecting portions of bearing plates 26.

In the particular application shown the flat sides of the opposed frusto-conical bearing members 26 are secured to the interior walls of shell 18 and the flat side walls 22 of cylindrical block 21, as by bonding with an appropriate cement or similar substance.

The depending neck 23 of block 21 is adapted to be slipped over the upper end of tubular member 14 and fits within an expanded bore 28 formed by enlarged holes formed in the center of slabs 15. Inserted within the upper end of tubular member 14 is a reinforcing block 29 of hardwood or similar material which is bonded to the interior of the tubular member and which resists crushing loads which might possibly cause the upper end of the tubular column 14 to collapse. The neck 23 of block or sheave 21 is secured to the upper end of tubular column 14 by fusible thermoplastic cement which will permit the sheave 21 to be removably secured to the top of the tubular member 14. Thus, should the block or sheave 21 show signs of wear or should it be necessary to remove tubular member 14 for any reason from its connection with the block 21 the assembly is placed in a moderately hot oven and the bond between neck 23 and column 14 is fused or dissolved. However, in order to secure the wearer of the leg against possible failure of the bond between the two members a through bolt 30 passes through the walls of both the neck 23 of block 21 and the wall of tubular member 14. It also passes through hardwood block 29 and secures it against inadvertent dislocation within column 14. An access hole 31 is formed through one of the slabs 15 to permit access to the through bolt 30 to permit the removal or insertion of the through bolt.

When the wearer of the leg imposes his weight upon the tubular column 14 it is forced upwards and carries the associated cylindrical sheave or block 21 upwards with it. The upward movement of tubular column 14 and cylindrical block 21 is permitted by the deflection of the links or connecting elements 13 since the frusto-conical members 26 mounted on either side 22 of block 21 will be driven upward while the weight of the wearer will tend to carry the frusto-conical members 26 affixed to the walls of the shell 18 downwards. The resilient discs 27 will thus be placed in shear and the thigh section 11 and shank section 12 will be carried toward each other until the V-shaped elements 20 are forced into the V-grooves 24 in the upper surface of the block 21. The V-grooves 24 in cooperation with V-shaped elements 20 serve to lock the leg in its extended position and the knee joint cannot be broken until the weight of the wearer is removed therefrom. When the wearer of the leg removes his weight from it the V-shaped elements 20 are lifted out of V-grooves 24 by the return of the links 13 to their unloaded positions. Also, the locking of the plurality of V-shaped elements 20 in the plurality of V-grooves 24 prevents the imposition of a greater load upon the resilient joints than they are designed to bear since the mating of V-shaped elements 20 and V-grooves 24 limits the extent of the longitudinal movement between the shank and thigh section. The provision of a plurality of V-grooves and V-shaped elements also serves to prevent the lateral bending of the shank 12 when it is in the locked position by providing a broad base upon which the thigh section is locked to the shank section of the leg.

When the weight of the wearer is removed from the leg by the lifting of the foot from the ground the resilient connectors or links 13 return to their unstressed position, moving shank section 12 away from thigh section 11 and withdrawing V-grooves 24 from contact with V-shaped elements 20. The lock on the knee joint is thus released and the resilient links 13 then return to their original unloaded position by carrying the shank 12 backward until it assumes a normally bent position and raises the foot of the leg off the ground. When the wearer comes to that part of his stride in which he is ready to impose his weight upon the artificial leg he swings the leg forward on his stump. The forward impetus imparted to the shank 12 by the forward swinging of the entire leg causes the shank 12 to be straightened under the thigh section 11 and permits the weight of the wearer to be borne thereupon. When the weight of the wearer is imposed on the leg the V-shaped elements 20 are forced into the V-grooves 24 and cause the knee joint to be locked by the weight of the wearer.

As is well known, considerable shock loads are sustained by the normal foot and leg structure of the average person as he walks. However, these loads are absorbed and cancelled out by the musculature and bone structure of a normal leg. In conventional artificial legs, however, the linkages or connections between the several portions of the leg are usually direct and act as efficient transmitters of the shock loads through the various sections of the leg into the stump of the wearer. The character of the stump naturally makes the imposition of such loads critical in the extreme and an unnatural gait results since the wearer tends to use his artificial leg in such a manner as to place as light a load upon it as possible.

In the knee joint construction which is the subject of the present invention the embodiment of resilient links 13 therein provides shock absorbing characteristics which serve to eliminate or absorb the greater portion of the shock before it is transmitted into the stump itself. The longitudinal translation of the shank 12 and thigh 11 in relationship to each other and as controlled by resilient links or connectors 13 constitutes one of the major advantages of this type of construction in that it permits the amputee to use the leg without discomfort or hesitancy.

Recent investigation of walking patterns has revealed that there is a certain amount of flexibility in a normal knee joint which permits a limited amount of twisting of the shank of the leg along its vertical axis. As the shank 12 of the leg of the present invention is thrown forward the resilient links 13 permit a certain amount of axial movement of the shank and its associated foot. This is a considerable advantage in the simulation of a natural stride by the wearer of the prosthesis. Of course, the elimination of conventional mechanical linkages such as pushrods, pulleys and cables eliminates most of the noise encountered in the actuation and movement of previous artificial legs.

A resilient link or connecting element 32 which is essentially similar in construction to that used in the knee joint described above is incorporated in the ankle joint 33. As can be seen from the drawing (Figure 5), the lower end of tubular column 14 projects below the lowermost slab 15. There is slipped over the lower end of the tubular member 14 a tubular connector 34 which, as it extends into the structure of the artificial foot 35, is necked down to provide an elongate, flat sided, depending member 36 having an arcuate lower end, upon which the artificial foot 35 is adapted to be mounted through the intermediary of links 32.

Artificial foot 35 has formed therein a central well 37 which is adapted to receive the elongated lower end 36 of tubular element 34. Fastened to tubular column 14 and secured about the exterior of tubular element 34 is a sleeve 38 having its lower portion flared out into a flange or skirt 39. Located within the interior of tubular column 14 at the point where tubular member 34 and sleeve 38 are joined to the tubular column 14 is a cylindrical block 40 of hardwood or similar material adapted to act as a reinforcing agency to resist compressive loads which are placed upon the tubular column 14 in this region. The reinforcing block 40 may be cemented or otherwise affixed to the interior of tubular column 14 and a pin or bolt 41 is inserted therethrough which also passes through the wall of tubular column 14, tubular member 34 and sleeve 38 to insure that they are retained in a predetermined location to each other. Room is made for the expanded section created by the mounting of tubular member 34 and sleeve 38 about the lower end of tubular column 14 by cutting an enlarged bore in the slabs 15.

The basic structure of foot 35, which is not a part of the present invention but which is briefly described here for purposes of clarity, is disclosed in co-pending application, Serial No. 773,257 filed September 10, 1947. The foot 35 includes an interior structure which is composed largely of blocks 42 of balsa or similar lightweight material so positioned that the loads sustained by them are carried along the grain of the material. The blocks 42 of balsa are secured together by means of strips 43 of plastic impregnated laminate which also project into central well 37 in foot 35 and which serve as liners therefor. Secured to the plastic impregnated strips 43 which line the sides of central well 37 are trapezoidal mounting plates 44 formed of the same material and bonded to strips 43. These plates are secured to the structure of the foot at their top portions by means of fasteners 45 and at their lower portions they have pins 46 running therethrough which have mounted thereupon spacer-sleeves 47 which are adapted to reinforce the well structure and which also prevent mounting plates 44 from being torn from the walls of the well 37. Bonded to mounting plates 44 on either side of well 37 are frusto-conical mounting or bearing plates or elements 48 which are designed to cooperate with similar frusto-conical metallic elements 48 bonded to the side walls of elongated portion 36 of tubular element 34. Positioned between the cooperating metallic elements 48 and vulcanized or otherwise securely bonded thereto are annular discs 49 of rubber or other resilient material embodying similar characteristics and having formed in their oppositely located sides concavities 50 adapted to receive the convexities 51 of metallic elements 48.

When the wearer of the artificial leg imposes his foot on the ground the foot is adapted to rotate in both a fore-and-aft direction upon member 34 through the intermediary of the resilient links 32 which impart sufficient spring to the foot to permit the simulation of a normal stride. To control the range through which the foot 35 will rotate upon the elongate portion 36 of member 34, sleeve 38 and its flared out skirt portion 39 are utilized as a stop. Thus when the foot is in a state of plantarflexion, as it is leaving the ground, the rear portion of the skirt 39 impinges on the area bordering the rear of the central well 37 of foot 35 and prevents a further deflection of the foot. In the case of dorsiflexion, the upward tilting of the forward portion of the foot is limited by the impingement of the forward portion of skirt 39 upon the area of the foot bounding the forward wall of the well 37. In this manner the rotation of the foot is confined within predetermined limits based upon the size and stride of the wearer and incorporated in the shape of the skirt 39. There is thus provided a linkage between the various sections of an artificial leg which is simple in construction and mode of operation and which imparts to the leg verisimilitude of actuation.

The above embodiment of the invention has been described to illustrate the details of construction and mode of operation of the invention and it is not intended to limit the invention to the details thereof, since the limitations of the invention are fully delineated in the appended claims.

I claim:

1. A linkage for joining one portion of an artificial leg to another portion comprising a mounting element secured to the one portion, a mounting element secured to the other portion, a disc of resilient material interposed between the opposite faces of said mounting elements and securely bonded thereto to connect the one portion of said leg to the other portion of said leg.

2. A linkage for joining the shank portion to the thigh portion of an artificial leg comprising a mounting element secured to the lower end of said thigh portion, a mounting element secured to the upper end of said shank portion and a disc of resilient material bonded to the opposed surfaces of said mounting elements and adapted to secure them in operable relationship to each other.

3. A linkage for joining one portion of an artificial leg to another portion comprising a cylindrical mounting element secured to the one portion, a cylindrical mounting element secured to the other portion and an annular disc of resilient material interposed between the opposed faces of said cylindrical mounting elements and adapted to join them together, thus joining said one member to said other member in operative relationship thereto.

4. A linkage for joining one portion of an artificial leg to another portion, said one portion having an end thereof penetrating into the other portion, mounting elements secured to both sides of said one portion where it penetrates into said other portion, mounting elements secured to the interior of said other portion contiguous to the mounting elements on said one portion and discs of resilient material interposed between said pairs of opposed mounting elements and bonded thereto to form connector means adapted to secure said one portion of said leg to said other portion.

5. A linkage for joining one portion of an artificial leg to another portion, said one portion having an end thereof penetrating into the other portion, cylindrical mounting elements secured to both sides of said one portion where it penetrates into said other portion, cylindrical mounting elements secured to the interior of said other portion contiguous to the cylindrical mounting elements on said one portion and annular discs of resilient material interposed between pairs of opposed cylindrical mounting elements and bonded thereto to form connector means adapted to secure the said one portion of said leg to said other portion.

6. A linkage for joining one portion of an artificial leg to another portion comprising, a cylindrical frusto-conical mounting element secured to the one portion, a cylindrical, frusto-conical mounting element secured to the other portion, an annular concave disc of resilient material interposed between the opposed frusto-conical faces of said mounting elements and bonded thereto to join said one member to said other member in operative relationship thereto.

7. A linkage for joining one portion of an artificial leg to another portion, said one portion having an end thereof penetrating into the other portion comprising, cylindrical, frusto-conical mounting elements secured to both sides of the one portion where it penetrates into said other portion, cylindrical, frusto-conical mounting elements secured to the interior of said other portion contiguous to the cylindrical, frusto-conical mounting elements on said one portion and annular discs of resilient material, having concave sides adapted to receive the frusto-cones of said mounting elements, interposed between the juxtaposed mounting elements and bonded thereto to form connector means adapted to secure said one portion of said leg to said other portion.

8. A linkage for joining the shank portion of an artificial leg to the thigh portion, comprising a tubular column extending from the upper end of said shank portion, said tubular column having a cylindrical block removably mounted thereupon, said thigh portion having its lower end surrounding said cylindrical block, mounting elements secured to both sides of said block, mounting elements secured to the interior of the lower end of said thigh portion contiguous to the mounting elements on said block and discs of resilient material interposed between pairs of opposed mounting elements and bonded thereto to form connector means adapted to secure said shank portion to said thigh portion.

9. A linkage for joining the shank portion of an artificial leg to the thigh portion, comprising a tubular column extending from the upper end of said shank portion, said tubular column having a cylindrical block removably secured thereupon, said thigh portion having its lower end surrounding said cylindrical block, cylindrical, frusto-conical mounting elements secured to both sides of said block, cylindrical frusto-conical mounting elements secured to the interior of the lower end of said thigh portion contiguous to the mounting elements on said block and annular discs of resilient material having concave sides adapted to receive the frusto-cones of said mounting elements interposed between the juxtaposed mounting elements and bonded thereto to form connector means adapted to secure said shank portion to said thigh portion.

10. A knee joint for an artificial leg having a shank portion and a thigh portion, comprising a tubular column extending upwardly from said shank portion, a cylindrical block secured to said tubular column, a plurality of V-grooves formed in the surface of said cylindrical block, mounting means secured to both sides of said cylindrical block, said thigh portion having its lower end substantially surrounding said cylindrical block, the lower end of said thigh portion having mounted thereupon V-shaped elements adapted to cooperate with the V-grooves in said cylindrical block, mounting means secured to both sides of the interior of the lower end of said thigh portion, and discs of resilient material secured and bonded between said mounting means to form connectors adapted to secure said shank portion to said thigh portion.

11. An ankle joint adapted to secure the foot portion of an artificial leg to the shank portion, said foot portion having a central well therein, comprising a tubular element having a necked down portion protruding from said shank portion into said central well in said foot portion, mounting means secured to the sides of said central well, mounting means secured to said necked down portion of said tubular element and resilient disc means interposed between and bonded to said mounting means to form a connection between said foot portion and said shank portion.

12. An ankle joint adapted to secure the foot portion of an artificial leg to the shank portion, said foot portion having a central well therein, comprising a tubular element having a necked down portion protruding from said shank portion into said central well in said foot portion, mounting means secured to the sides of said central well, mounting means secured to the sides of said necked down portion of said tubular element, resilient disc means interposed between and bonded to said mounting means to form a connection between said foot portion and said shank portion and stop means secured about the periphery of said tubular element to limit the movement of said foot means upon said connection.

13. An ankle joint adapted to secure the foot portion of an artificial leg to the shank portion, said foot portion having a central well therein, comprising a tubular element having a necked down portion protruding from said shank portion into said foot portion, cylindrical frusto-conical mounting means secured to the sides of said well in said foot portion, cylindrical, frusto-conical mounting means secured to said necked down portion of said tubular element and resilient disc means having concave sides adapted to receive and be bonded to the frusto-cones of said mounting means to form a connection between said foot portion and said shank portion.

GLENN G. HAVENS.

No references cited.